United States Patent
Comstock

(10) Patent No.: US 7,491,334 B2
(45) Date of Patent: Feb. 17, 2009

(54) METHOD OF TREATING REVERSE OSMOSIS MEMBRANES FOR BORON REJECTION ENHANCEMENT

(75) Inventor: Daniel L. Comstock, San Diego, CA (US)

(73) Assignee: North Pacific Research, LLC, San Marcos, CA (US)

(*) Notice: Subject to any disclaimer, the term of this patent is extended or adjusted under 35 U.S.C. 154(b) by 319 days.

(21) Appl. No.: 11/185,104

(22) Filed: Jul. 20, 2005

(65) Prior Publication Data

US 2006/0065598 A1    Mar. 30, 2006

Related U.S. Application Data

(60) Provisional application No. 60/614,500, filed on Sep. 29, 2004.

(51) Int. Cl.
*B01D 61/02* (2006.01)
*B01D 61/12* (2006.01)
*B01D 63/10* (2006.01)
*B01D 63/12* (2006.01)

(52) U.S. Cl. .............. 210/652; 210/650; 210/651; 210/653; 210/321.69; 210/501

(58) Field of Classification Search .......... None
See application file for complete search history.

(56) References Cited

U.S. PATENT DOCUMENTS

| | | | |
|---|---|---|---|
| 3,853,755 A | 12/1974 | Ganci | |
| 4,366,062 A | 12/1982 | Kurihara et al. | |
| 4,894,165 A | 1/1990 | Fibiger et al. | |
| 4,909,943 A | 3/1990 | Fibiger et al. | |
| 4,927,540 A | 5/1990 | Wessling et al. | |
| 5,250,185 A | 10/1993 | Tao et al. | |
| 6,264,936 B1 | 7/2001 | Sawan et al. | |
| 6,709,590 B1 | 3/2004 | Hirose | |
| 6,805,796 B2 | 10/2004 | Hirose et al. | |
| 6,821,430 B2 | 11/2004 | Andou et al. | |
| 2003/0066805 A1* | 4/2003 | Andou et al. | 210/754 |
| 2003/0213750 A1 | 11/2003 | Koslow | |
| 2004/0065617 A1 | 4/2004 | Wlif et al. | |
| 2004/0256309 A1 | 12/2004 | Tomioka et al. | |

* cited by examiner

*Primary Examiner*—Krishnan S Menon
(74) *Attorney, Agent, or Firm*—Sheppard Mullin Richter & Hampton LLP

(57) ABSTRACT

The present invention provides a method of treating a reverse osmosis membrane for boron rejection enhancement, comprising contacting the reverse osmosis membrane with a chemical coating such as PHMB, wherein the reverse osmosis membrane is part of a single-pass reverse osmosis system is configured to reduce the boron concentration of normal seawater or brackish water to less than a predetermined amount.

11 Claims, 6 Drawing Sheets

| Flux and Rejection Values ||||
|---|---|---|---|
| Sample | Flux, gfd | Rejection$_{cond}$, % | Rejection$_{boron}$, % |
| Uncoated | 31.8 | 99.3 | 92.7 |
| Coated at 800 psig | 8.8 | 95.2 | 86.8 |
| Coated at 100 psig | 23.4 | 99.6 | =>97.6 |
| Above rinsed in SW for 2 days | 27.4 | 99.7 | =>97.6 |
| Manufacturer specifications | 17-20 | 99.1 | 85-90 |

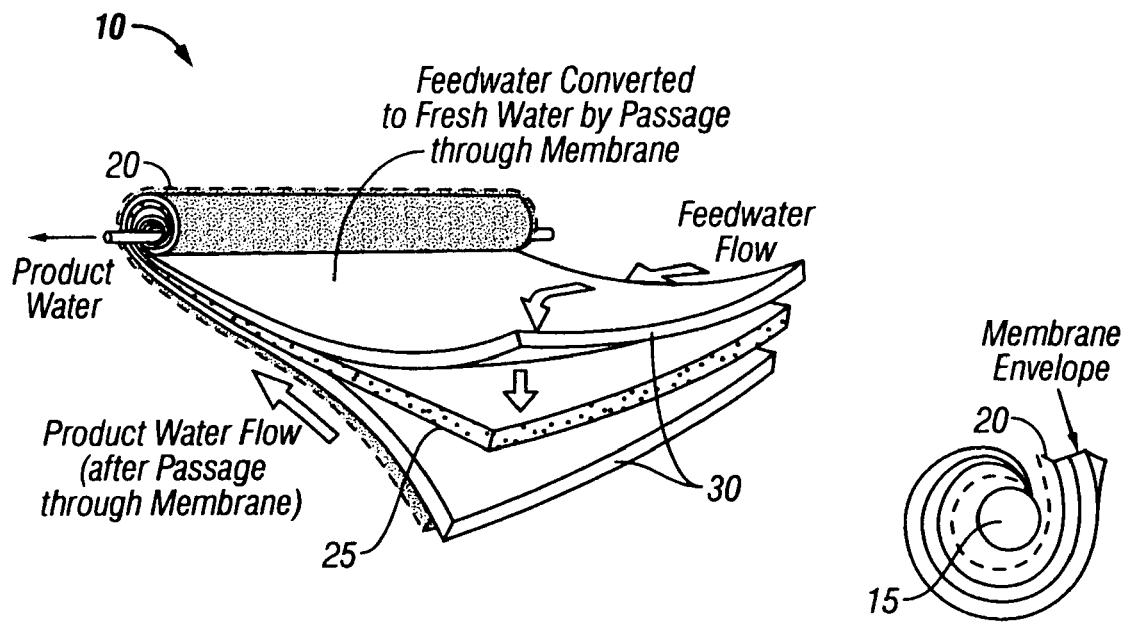
FIG. 1A
(Prior Art)
FIG. 1B
(Prior Art)
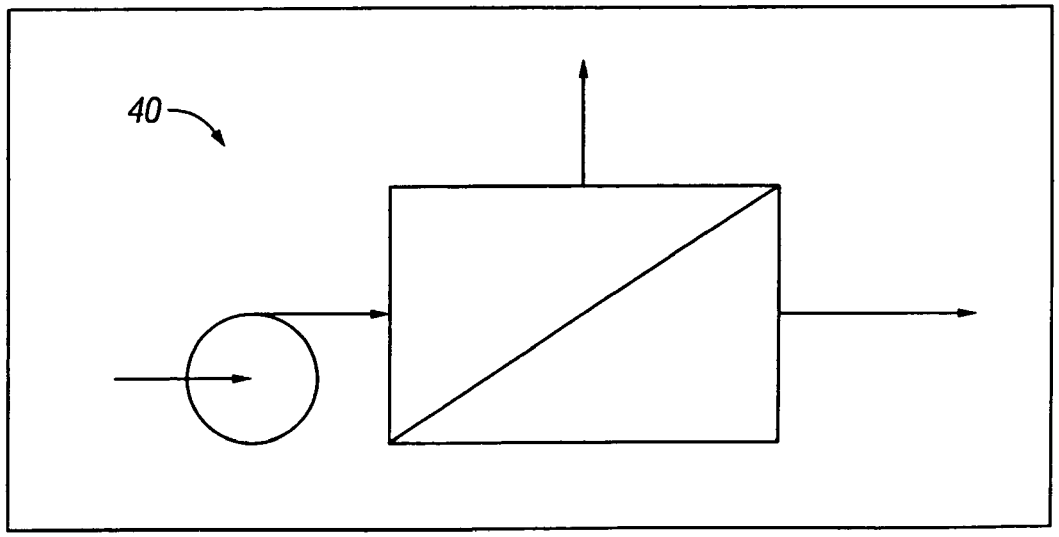
FIG. 2

| A and B Values ||||
|---|---|---|---|
| Sample | A, cm/atm-sec | $B_{conductivity}$, cm/sec | $B_{boron}$, cm/sec |
| Uncoated | 5.16E-5 | 1.00E-5 | 1.19E-4 |
| Coated at 800 psig | 1.41E-5 | 2.12E-5 | 6.25E-5 |
| Coated at 100 psig | 3.82E-5 | 4.65E-5 | 2.74E-5 |
| Above rinsed in SW for 2 days | 4.49E-5 | 4.18E-6 | 3.22E-5 |
| Manufacturer specifications | 3.40 to 4.60 E-5 | 7.35 to 9.94E-6 | 1.08 to 1.71 E-4 |

FIG. 6

| Flux and Rejection Values ||||
|---|---|---|---|
| Sample | Flux, gfd | $Rejection_{cond}$, % | $Rejection_{boron}$, % |
| Uncoated | 31.8 | 99.3 | 92.7 |
| Coated at 800 psig | 8.8 | 95.2 | 86.8 |
| Coated at 100 psig | 23.4 | 99.6 | =>97.6 |
| Above rinsed in SW for 2 days | 27.4 | 99.7 | =>97.6 |
| Manufacturer specifications | 17-20 | 99.1 | 85-90 |

FIG. 7

| Chemicals Evaluated | | |
|---|---|---|
| Number | Chemical name | Abbreviation |
| 150 | Benzalkonium chloride | BKC |
| 155 | Lauramine oxide | Ammonyx LO |
| 160 | Tannic acid | - |
| 165 | Poly(2-hydroxypropyl-N,N-dimethylammonium chloride) | EPI/DMA |
| 170 | Cocamide propyl betaine | Amphosol HCA |
| 175 | Polyhexamethylene biguanide hydrochloride | PHMB |
| 180 | Octyl imino dipropionate | Amphoteric 400 |
| 185 | Nonylphenol ethoxylate | Surfonic N-1000 |
| 190 | Tetrakishydroxymethyl phosphonium sulfate | THPS |

*FIG. 8*

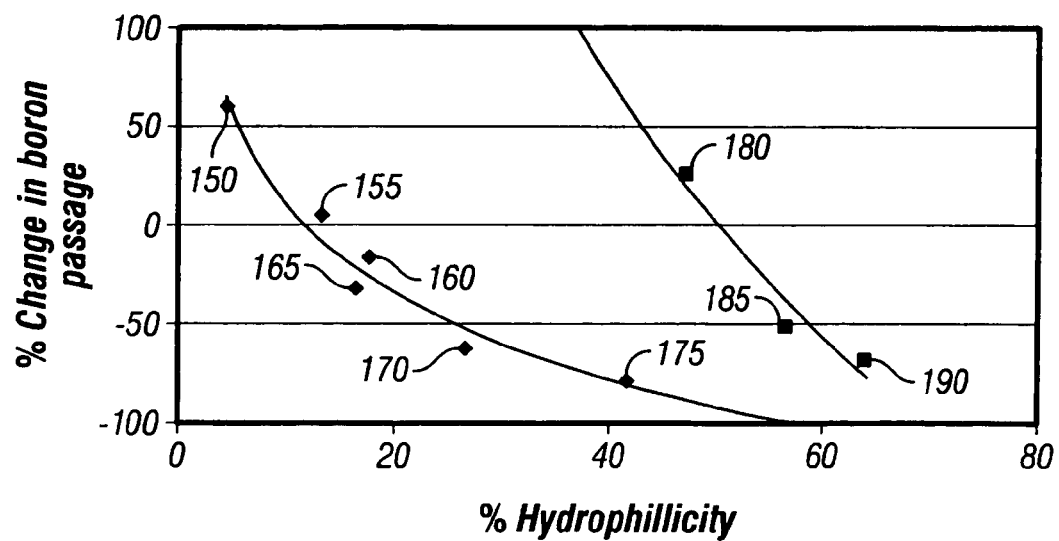

*FIG. 9*

| Hydrophillic Groups | |
|---|---|
| Group | Symbol |
| Quaternary nitrogen | $N^+$ |
| Carboxyl | $-COOH$ or $-COO^-$ |
| Carbonyl | $-C=O$ |
| Ethoxylate | $-OCH_2-$ |
| Alcohol | $-OH$ |
| Phosphonium | $P^+$ |
| Amine | $N, NH$ |
| Imine | $=NH, =NH_2^+$ |
| Glycoside oxygen | $-O-$ |
| Phenoxide oxygen | $-O^{-1}$ |

FIG. 12

| Treatment chemical group | Target membrane group | Type of attachment |
|---|---|---|
| $=NH^+$<br>$NR^1R^2R^3R^4{}^+$<br>$PR_4^+$ | $COO^-$ | Electrostatic |
| $-(CH_2)-$<br>Aromatic groups | Aromatic groups | Hydrophobic |
| $-NH$<br>$-COOH$<br>$-O^-$<br>$-CHO-$ | $COOH, COO^-$<br>$COO^-, COOH$<br>$NH, COOH$<br>$NH, COOH$ | Dipole attraction |
| $-O^-, COO^-$ | $COO^-$ | Bridging with polyvalent metal ions<br>($Mg^{+2}, Ca^{+2}, Fe^{+2}, Al^{+3}, Fe^{+3}$) |

FIG. 13

METHOD OF TREATING REVERSE OSMOSIS MEMBRANES FOR BORON REJECTION ENHANCEMENT

REFERENCE TO RELATED APPLICATIONS

This application claims priority from and is a Continuation-In-Part of U.S. Provisional Patent Application Ser. No. 60/614,500 filed Sep. 29, 2004.

FIELD OF THE INVENTION

The present invention is directed to a method of treating reverse osmosis membranes for boron rejection enhancement.

BACKGROUND OF THE INVENTION

Boron is present in significant concentrations in seawater and in many natural brackish waters. Since high concentrations of boron are toxic to animals and many plants, boron is regulated in municipal water supplies. Boron concentrations for United States water supplies range from about 0.005 parts-per-million to about 2 parts-per-million, whereas boron concentrations for Los Angeles water supplies range from about 0.12 parts-per-million to about 0.281 parts-per-million. On the other hand, typical seawater has boron concentrations of approximately 4.6 parts-per-million.

Organizations such as the World Health Organization (WHO) and the Environmental Protection Agency (EPA) have proposed drinking water regulations having various limits for boron concentration. Particularly, the WHO has proposed a strict provisional boron concentration limit of 0.5 parts-per-million, while the EPA has set forth a more lenient boron limit of 3 parts-per-million for adults and 0.9 parts-per-million for children. Jurisdictions that have existing drinking water regulations for boron include Europe, Canada and Minnesota. Specifically, Europe has a boron limit of 1 part per million, Canada has a boron limit of 5 parts-per-million and Minnesota has a boron limit of 5 parts-per-million.

Treatment options for reducing boron concentration in drinking water include reverse osmosis and ion exchange processes. Several types of ion exchange resin are employed for boron removal, including: (1) the use of a boron specific resin consisting of a styrene-DVB backbone with N-methyl glucamine active sites; and (2) the use of a mixture of conventional strong-acid-strong-base mixed bed resins. One drawback of ion exchange processes is that the conventional resins remove all other ions (in addition to boron ions), thereby necessitating frequent regeneration with acid and caustic. Another drawback concerns the high cost of ion exchange processes.

Due to the above-identified drawbacks associated with ion exchange processes, reverse osmosis is the most frequently used treatment option for reducing boron concentration in sea and brackish waters. However, conventional seawater reverse osmosis systems do not meet the stringent provisional WHO boron limit of 0.5 parts-per-million. In fact, typical seawater reverse osmosis systems produce permeate with boron concentrations in the range of about 1.0 parts-per-million to about 1.2 parts-per-million. Moreover, boron concentrations levels tend to increase as the reverse osmosis membranes age.

Referring to FIGS. 1A (prior art) and 1B (prior art), most seawater reverse osmosis systems include a spiral wound membrane construction comprising a series of spiral wound elements 10 constructed with polyamide salt-rejecting membranes. Spiral wound element 10 comprises permeate tube 15, spacer 20, permeate carriers 25 and polyamide membranes 30. Pores within polyamide membranes 30 are constructed to reject ionic species such as sodium and chloride, while permitting water molecules to pass. Such seawater reverse osmosis systems are generally operated at pressures between 800 and 1000 psig, depending upon the salinity of the feed water and the precise manufacturing process. Water flux typically ranges from about 7 to 12 gallons per day per square foot of membrane surface area. Spiral wound elements 10 are expected to last at least three years before replacement.

Reverse osmosis systems are employed by many municipalities to produce drinking water from brackish water and seawater. In addition, some wastewater districts use reverse osmosis to reclaim wastewater for agricultural use or to prevent seawater intrusion into groundwater supplies. Reverse osmosis systems are also widely used by many industries to produce water with reduced levels of total dissolved solids. For example, reverse osmosis is used in the power industry for boiler makeup, in the electronics industry as a rinse for electrical components, in the chemical industry as a solvent and for rinsing, in the pharmaceutical industry for USP grade water production, in the mining industry for metals extraction, in the beverage industry for soft drink preparation, in the plating industry for plating bath preparation, and in the pulp and paper industry for paper manufacture.

Seawater reverse osmosis systems such as described in U.S. Pat. No. 6,709,590 may be constructed in multiple-pass arrays in order to meet the WHO's proposed boron limit. However, water costs for multi-pass seawater reverse osmosis systems are significantly higher than that of water costs for single-pass seawater reverse osmosis systems that do not meet the strict boron limit proposed by the WHO. In addition, some multiple-pass systems are augmented with boron-specific ion exchange resin for the purpose of converting non-ionized boric acid to negatively charged borate ion, which is more highly rejected.

U.S. Pat. No. 6,264,936 discloses the use of various organic biocidal chemicals including poly(hexamethylenebiguanide) hydrochloride (PHMB) for coating materials such as polysulfone and nylon sheets. However, this patent is not directed to the use of PHMB and other chemicals as a coating for membranes of a reverse osmosis membranes system to enhance boron rejection.

In view of the above, there exists a need for a single-pass reverse osmosis system capable of reducing the boron concentration in normal seawater to a level below 0.5 parts-per-million.

There also exists a need for a single-pass reverse osmosis system having membranes coated with chemicals such as PHMB to increase boron rejection capabilities.

Additionally, there exists a need for a single-pass reverse osmosis system having membranes coated with biocidal chemicals such as PHMB to reduce biofouling of reverse osmosis membrane surfaces.

There further exists a need for a single-pass reverse osmosis system that is less expensive than conventional ion exchange processes and multiple-pass reverse osmosis systems to reduce the cost of desalting seawater and brackish water.

SUMMARY OF THE INVENTION

In view of the foregoing, it is an object of the present invention to provide a single-pass reverse osmosis system capable of reducing boron concentration in normal seawater to a level below 0.5 parts-per-million.

It is another object of the invention to provide a single-pass reverse osmosis system having membranes coated with chemicals such as PHMB to increase boron rejection capabilities.

It is an additional object of the invention to provide a single-pass reverse osmosis system having membranes coated with biocidal chemicals such as PHMB to reduce biofouling of reverse osmosis membrane surfaces.

It is a further object of the invention to provide a single-pass reverse osmosis system that is less expensive than conventional ion exchange processes and multiple-pass reverse osmosis systems.

One aspect of the present invention involves a method of treating a reverse osmosis membrane for increased boron rejection, comprising contacting the reverse osmosis membrane with a chemical coating. According to the preferred embodiment of the invention, the chemical coating is selected to include PHMB, and the reverse osmosis membrane is part of a single-pass reverse osmosis system configured to reduce the boron concentration of normal seawater or brackish water to less than 0.5 parts-per-million.

According to further embodiments of the invention, the chemical coating may further comprise: benzalkonium chloride; lauramine oxide; tannic acid; poly(2-hydroxypropyl-N,N-dimethylammonium chloride); cocamide propyl betaine; poly (hexamethylene biguanide) hydrochloride; octyl imino dipropionate; nonylphenol ethoxylate; or tetrakishydroxymethyl phosphonium sulfate. According to additional embodiments, the chemical coating may include bactericidal properties selected from the group consisting of: guanides; N-alkyl betaines; N-alkyl-N,N-dimethylylamine oxides; and phosphonium compounds.

Another aspect of the present invention involves a method of treating a seawater reverse osmosis membrane for boron rejection enhancement, comprising contacting the reverse osmosis membrane with a chemical coating, wherein the reverse osmosis membrane is part of a single-pass reverse osmosis system is configured to reduce the boron concentration of seawater or brackish water to less than 0.5 parts-per-million. The chemical coating may comprise one or more of the following chemicals: benzalkonium chloride; lauramine oxide; tannic acid; poly(2-hydroxypropyl-N,N-dimethylammonium chloride); cocamide propyl betaine; 6) PHMB; octyl imino dipropionate; nonylphenol ethoxylate; and tetrakishydroxymethyl phosphonium sulfate.

According to the preferred embodiment, the reverse osmosis membrane comprises polyamide membrane surfaces, and the chemical coating comprises charged elements for bonding with the polyamide membrane surfaces. The charged elements may be selected from the group consisting of: $NH_2^+$; $NR^1R^2R^3R^{4+}$; $PR_4^+$; $—CH_2—$; NH; COOH; $O^-$; CHO; $COO^-$; and aromatic elements. In some embodiments, electrostatic bonds or hydrophobic bonds are formed between the charged elements and the polyamide membrane surfaces. In other embodiments, the bonding between the charged elements and the polyamide membrane surfaces is produced by dipole attraction or bridging with polyvalent metal ions.

According to some embodiments of the invention, the chemical coating includes hydrophobic alkane groups or hydrophobic aromatic groups. According to other embodiments, the chemical coating contains hydrophilic chemicals having hydrophilicity values greater than 25 percent, wherein the hydrophilic chemicals are selected from the group consisting of: quaternary amines; imines; and multiple phenoxides.

A further aspect of the present invention involves a method of treating a seawater reverse osmosis membrane for boron rejection enhancement, comprising contacting the reverse osmosis membrane with a chemical coating, wherein the chemical coating comprises chemicals selected from the group consisting of: poly(hexamethylenebiguanide) hydrochloride; cocamide propyl betaine; tetrakishydroxymethyl phosphonium sulfate; and nonylphenol ethoxylate, wherein the chemical coating comprises biocidal properties, and wherein the reverse osmosis membrane is part of a single-pass reverse osmosis system is configured to reduce the boron concentration of seawater or brackish water to less than 0.5 parts-per-million.

BRIEF DESCRIPTION OF THE DRAWINGS

FIGS. 1A and 1B (prior art) illustrates a conventional spiral wound membrane element for a seawater reverse osmosis system;

FIG. 2 is a schematic diagram illustrating a single-pass seawater reverse osmosis system for boron rejection enhancement in accordance with the principles of the present invention;

FIG. 6 is a table depicting PHMB test results for constants A and B;

FIG. 7 is a table depicting PHMB test results for flux and rejection values;

FIG. 8 is a table depicting chemical coatings tested to define chemical properties that are correlated with enhanced boron rejection in a single-pass seawater reverse osmosis system;

FIG. 9 is a chart illustrating percentage change in boron passage plotted as a function of hydrophilicity percentage;

FIG. 12 is a table depicting the hydrophilic groups present in chemicals set forth in FIG. 8;

FIG. 13 is a table depicting charged elements (and groups of charged elements) contained in the treatment chemicals that are capable of bonding with polyamide membrane surfaces.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to a method of treating a reverse osmosis membrane, wherein the reverse osmosis membrane is put in contact with a chemical coating having properties for increased boron rejection. The chemical coating may also comprise a biocidal coating that reduces biofouling of reverse osmosis membrane surfaces. The preferred coating of the present invention comprises poly(hexamethylenebiguanide) hydrochloride (PHMB), which provides the desired boron rejection enhancement and biocidal properties.

In accordance with the principles of the invention, testing was conducted on a plurality of chemical candidate to identify chemicals that significantly reduce overall salt passage across polyamide test membranes. Chemicals that met this criterion were then tested for their boron rejection capabilities. The goal of the testing was to meet the WHO boron concentration limit of 0.5 parts-per-million using a single-pass reverse osmosis system on brackish and seawaters. The desired boron rejection capabilities may be accomplished using membranes coated with various chemicals including PHMB, which is manufactured, for example, by Arch Chemicals, Inc. (Norwalk, Conn.). Commercial uses for PHMB include, but are not limited to: (1) swimming pool sanitization; (2) preservation of industrial formulations; and (3) commercial and industrial disinfection applications.

Figure 3:
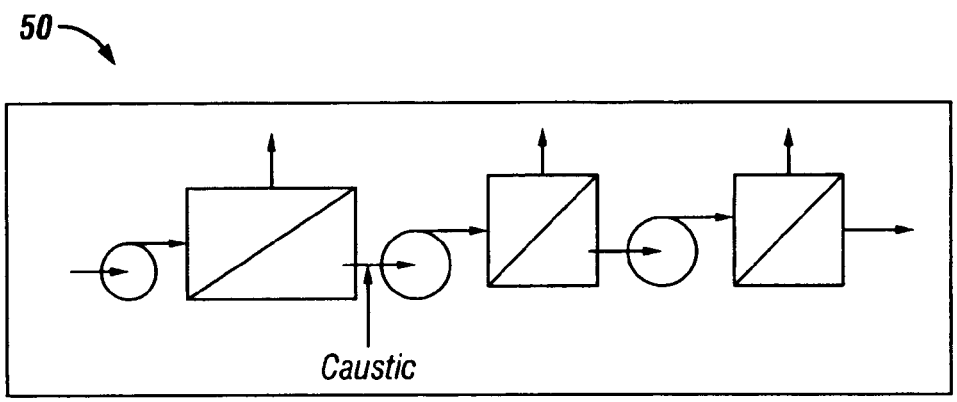
FIG. 3 is a schematic diagram illustrating a three-pass seawater reverse osmosis+caustic system.
Figure 4:
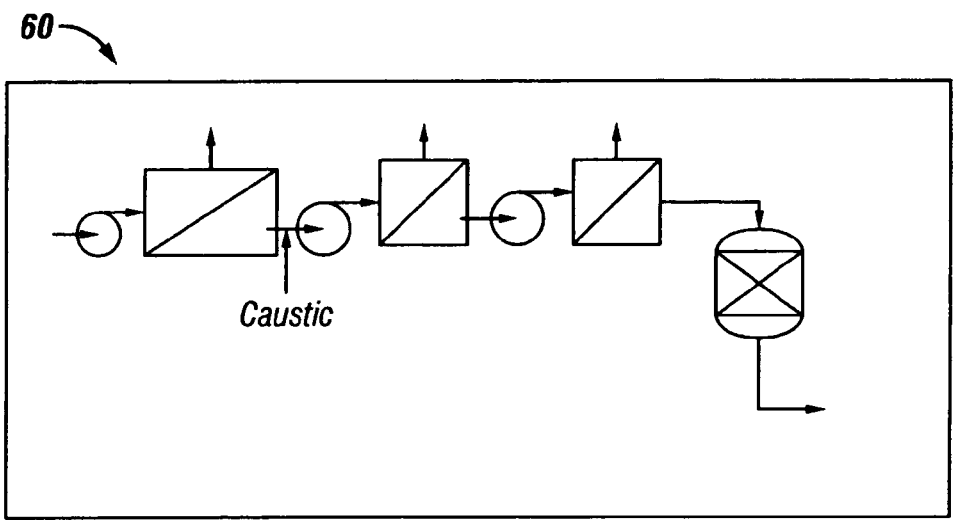
FIG. 4 is a schematic diagram illustrating a three-pass seawater reverse osmosis+caustic+IX system.

FIG. 2 is a schematic diagram illustrating a single-pass reverse osmosis system 40 for boron rejection enhancement in accordance with the principles of the present invention. As discussed hereinabove, a single-pass system is much more cost effective than multiple-pass systems. Advantageously, the use of a single-pass reverse osmosis rather than a multiple-pass reverse osmosis results in a dramatic cost savings. FIG. 3 depicts a three-pass reverse osmosis+caustic system 50, whereas FIG. 4 depicts a three-pass reverse osmosis+caustic+IX system 60.

Normal seawater contains approximately 4.6 mg/L of boron, as set forth in *Marine Chemistry—The Structure of water and the Chemistry of the Hydrosphere*, R. A. Horne, Wiley-Interscience, 1969). However, there are seawater sources such as bays and seas that contain much higher boron levels than normal seawater. These sources may also contain total dissolved solids (TDS) levels that are significantly higher than normal seawater levels of approximately 35,000 mg/L. For waters with exceptionally high TDS levels, multiple pass systems may be required to reduce boron levels to less than 0.5 parts-per-million, even if the reverse osmosis elements are PHMB treated. Of course, a multiple pass system featuring PHMB treated elements will require fewer passes than a multiple pass system with uncoated elements.

In accordance with the principles of the present invention, a range of chemical coatings treatments were evaluated to better define the properties that lead to enhanced boron rejection. The treatment of a polyamide membrane with PHMB and other chemicals significantly increased boron rejection characteristics. The degree of improvement in boron rejection permits the attainment of the provisional WHO standards for boron using a single-pass design.

The present invention involves the use of chemically coated polyamide reverse osmosis membranes to enhance membrane performance by: (1) increasing boron rejection in seawater, brackish waters, and wastewater; (2) increasing rejection for all other ions contained in seawater, brackish water, and wastewater; and (3) to make membrane surfaces biocidal. The chemical coatings may be temporary or permanent, wherein permanent coatings are applied during manufacture and temporary coatings are applied in the field as needed. According to some embodiments of the invention, reverse osmosis membranes having temporary coatings may be re-coated after a predetermined amount of time. Specifically, membrane surfaces that have been degraded by chlorine, cleanings and aging may be repaired by re-coating the membrane.

Figure 5:
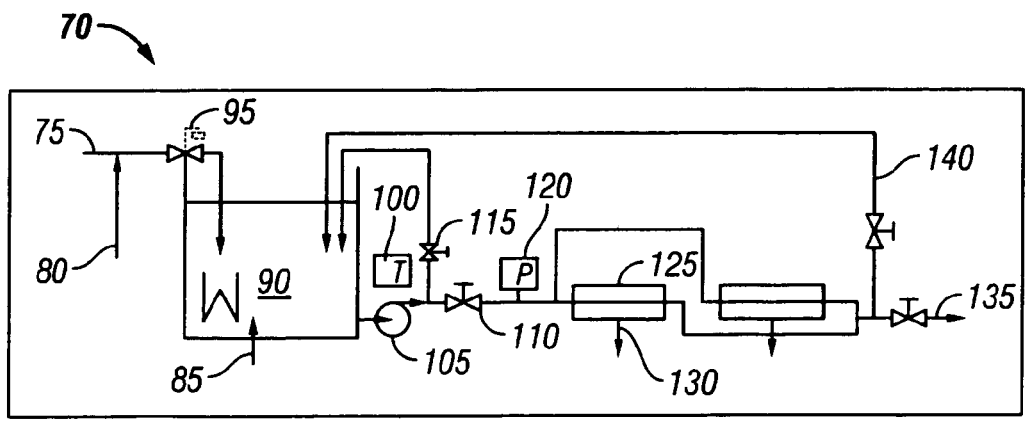
FIG. 5 is a schematic diagram illustrating a flat sheet seawater reverse osmosis testing system in accordance with the principles of the present invention.

Referring to FIG. 5, testing was performed on flat sheet seawater reverse osmosis system 70 including polyamide membranes (e.g., SW30, manufactured by The Dow Chemical Company, Midland, Mich.) in low and high-pressure test cells. Flat sheet seawater reverse osmosis system 70 comprises raw water line 75 (not used), chemical addition 80 (not used), sample reservoir 85, heat exchange coils 90, float valve 95 (not used), thermometer 100, pump 105, throttling valve 110, recycle throttling valve 115, pressure gauge 120, test cells 125, permeate stream 130, concentrate to drain 15 (not used), and recycle line 140 back to sample reservoir 85.

Test cells 125 include low-pressure test cells operated at 100 psig and high-pressure test cells capable of operating at pressures up to 1500 psig. Membrane coatings were applied by: (1) adding 50 parts-per-millions of active PHMB into either de-chlorinated city water or seawater; and (2) recycling the dosed water through the test cells and membranes for one hour. Coating in seawater was accomplished at 800 psig in the high-pressure test cells, whereas coating in de-chlorinated city water was accomplished at 100 psig in the low-pressure test cell.

After the coating process, the test cells were flushed thoroughly with fresh water to remove residual chemicals. Membrane samples that were coated in low-pressure test cells were transferred to high-pressure test cells for performance testing on seawater, including: (1) membrane flux; (2) total dissolved solids (TDS); and (3) boron concentrations from coated and uncoated membrane samples. TDS concentrations were determined by conductivity measurements, while boron concentrations were determined utilizing a spectrophotometer (e.g., the HACH DR/2010 Spectrophotometer, manufactured by Hach Company, Loveland, Colo.), for example using the Indigo Carmine method. Alternatively, boron concentration levels may be determined using atomic absorption spectroscopy (See, e.g., Spielholtz et. al; *Determination of boron in seawater by atomic absorption spectroscopy*, Mikrochimica Acta, 1974, 649-652).

Membrane flux was calculated by membrane permeate flow divided by membrane area divided by time. TDS and boron rejection values were calculated using the following expression:

$$\text{Rejection \%} = (1 - C_p/C_f) \times 100,$$

where $C_p$ is boron or TDS concentration in the permeate stream, and $C_f$ is boron or TDS concentration in the feed.

In the expression provided hereinbelow, A and B are performance constants calculated from the flux and rejection data by use of the following expressions:

$$B = ((1-R)/R)(NDP)(A),$$

where A is the rate of permeate flow across the membrane samples,

B is the rate of TDS passage across the membrane samples,

NDP is net driving pressure (e.g., the pump pressure or osmotic pressure), and

R is the rejection of boron (or salt) expressed as a fraction.

$$A = \text{Flux}/NDP$$

FIGS. 6 and 7 are charts summarizing the seawater test results for boron rejection using the system of FIG. 4. Specifically, FIG. 6 provides PHMB test results for constants A and B (as defined hereinabove), wherein the sample is: (1) uncoated; (2) coated at 800 psig; (3) coated at 100 psig; (4) above rinsed in seawater for 2 days; and (5) according to manufacturer specifications. Values for A are provided in units of cm/atm-sec, whereas values for B are provided in units of cm/sec.

FIG. 7 provides PHMB test results for flux and rejection values, wherein the sample is: (1) uncoated; (2) coated at 800 psig; (3) coated at 100 psig; (4) above rinsed in seawater for 2 days; and (5) according to manufacturer specifications. Values for flux are provided in units of gallons per square foot per day (gfd), while values for rejection are provided as a percentage. The measured seawater boron concentration was 4.1 parts-per-million. The test data was normalized to 25 degrees C. The boron detection limit is 0.1 parts-per-millions using the Indigo Carmine method.

Referring to FIG. 8, testing was performed to screen various chemical coatings to define chemical properties that are correlated with enhanced boron rejection in a single-pass seawater reverse osmosis system. The chemical coatings that were evaluated include:

(1) benzalkonium chloride 150 (BKC), manufactured by FeF Chemicals A/S of Denmark;

(2) lauramine oxide 155 (AMMONYX LO), manufactured by Stepan Company of Northfield, Ill.;

(3) tannic acid 160;

(4) poly(2-hydroxypropyl-N,N-dimethylammonium chloride) 165 (EPI/DMA), manufactured by Cytec Industries, Inc. of West Paterson, N.J.;

(5) cocamide propyl betaine 170 (AMPHOSAL HCA), manufactured by Stepan Company, Northfield, Ill.;

(6) poly (hexamethylene biguanide) hydrochloride 175 (PHMB), manufactured by Arch Chemicals, Inc. of Norwalk, Conn.;

(7) octyl imino dipropionate 180 (Amphoteric 400), manufactured by Tomah3 Products, Inc. of Milton, Wis.;

(8) nonylphenol ethoxylate 185 (SURFONIC N-1000) Huntsman Corporation of Salt Lake City, Utah; and (9) tetrakishydroxymethyl phosphonium sulfate 190 (THPS), manufactured by Rhodia, Inc. of Cranbury, N.J.

The chemical coatings of FIG. 8 were evaluated in the low-pressure cell-test cell on city water spiked with boric acid (boron concentration of 4 parts-per-million). Initially, membrane performance was determined prior to coating. The coating step was accomplished with 50 parts-per-million of active material (except for BKC 150, which was applied at 5 parts-per-million) with one hour of re-circulation at a pressure of approximately 100 psi. Following each coating step, the test cell was rinsed with de-chlorinated city water, and membrane performance was re-calculated.

Figure 10:
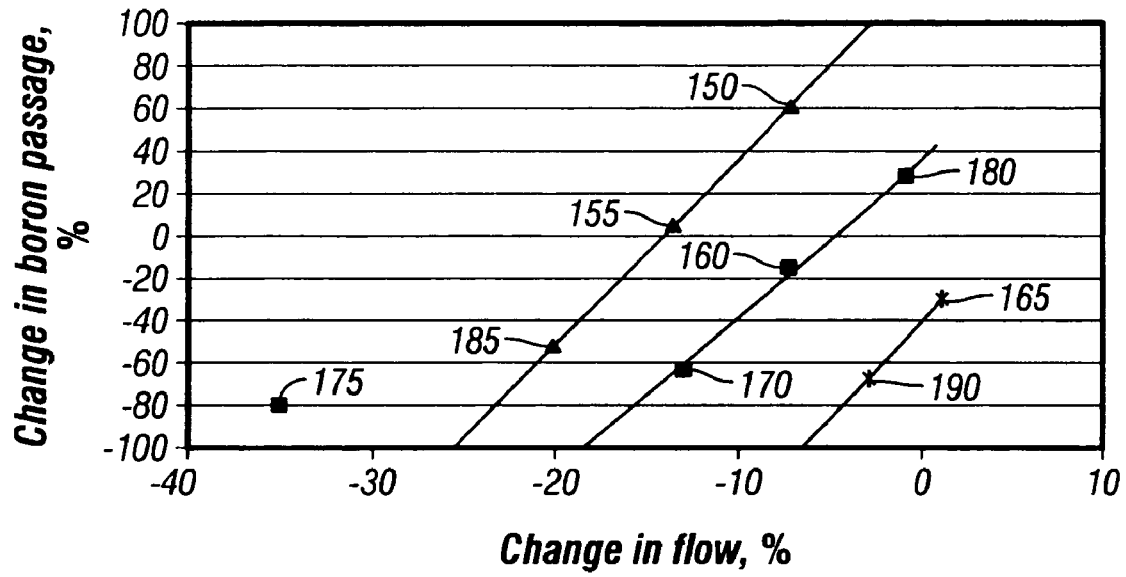
FIG. 10 is a chart illustrating percentage change in boron passage plotted as a function of percentage change in membrane flow after the chemical coating has been applied.
Figure 11:
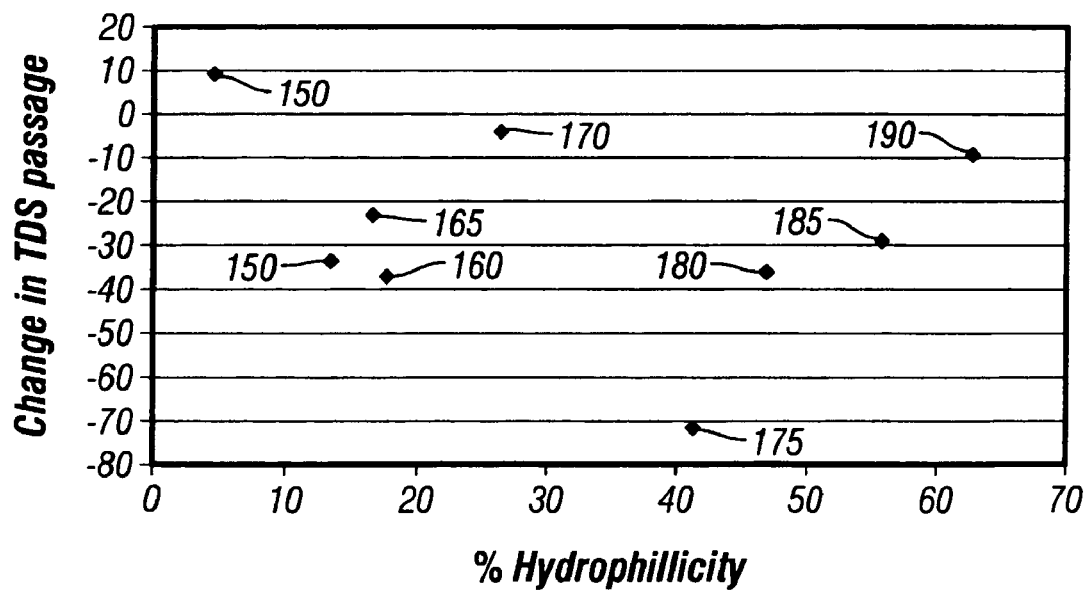
FIG. 11 is a chart illustrating change in TDS passage plotted as a function of hydrophilicity.

In FIGS. 9-11, data points 150, 155, 160, 165, 170, 175, 180, 185, 190 correspond with the chemical coatings set forth in FIG. 8, such that data point 150 is for BKC, data point 155 is for lauramine oxide, data point 160 is for tannic acid, data point 165 is for EPI/DMA, data point 170 is for cocamide propyl betaine, data point 175 is for PHMB, data point 180 for octyl imino dipropionate, data point 185 is for nonylphenol ethoxylate and data point 190 is for THPS.

FIGS. 9-11 are graphical depictions that summarize testing results for the chemicals set forth in FIG. 6. FIG. 9 is a chart illustrating percentage change in boron passage plotted as a function of hydrophilicity percentage. FIG. 10 is a chart illustrating percentage change in boron passage plotted as a function of percentage change in membrane flow after the chemical coating has been applied. FIG. 11 is a chart illustrating change in TDS passage plotted as a function of hydrophilicity. Hydrophilicity is the ratio of hydrophilic (water loving) atoms to total molecular weight, wherein the degree of hydrophobicity (water hating) is equal to 100-percent hydrophilicity percentage.

FIG. 12 is a chart that sets forth the hydrophilic groups present in chemicals set forth in FIG. 8. Specifically, the hydrophilic groups comprise: (1) quaternary nitrogen ($N^+$); (2) carboxyl (—COOH or —COO$^-$); (3) carbonyl (—C=O); (4) ethoxylate (—OCH$_2$—); (5) alcohol (—OH); (6) phosphonium ($P^+$); (7) amine (N, NH); (8) imine (=NH, =NH$_2^+$); (9) glycoside oxygen (—O—); and (10) phenoxide oxygen (—O$^{-1}$). These hydrophilic groups generally comprise electronegative elements and groups of elements. On the other hand, the hydrophobic groups primarily comprise alkene and aromatic moieties.

With further reference to FIG. 9, percentage change in boron passage is plotted as a function of hydrophilicity for each of the chemical coatings set forth in FIG. 6. Data points 150, 155, 160, 165, 170, 175, 180, 185, 190 are naturally divided into two groups, wherein Group I contains chemical coatings with a hydrophilic content of less than about 41 percent, and Group II contains chemical coatings with a hydrophilic content greater than about 41 percent. More particularly, Group I includes BKC 150, lauramine oxide 155, tannic acid 160, EPI/DMA 165, cocamide propyl betaine 170, and PHMB 175, whereas Group II includes octyl imino dipropionate 180, nonylphenol ethoxylate 185 and THPS 190.

With continued reference to FIG. 9, boron passage decreases with increasing hydrophilicity (or decreasing hydrophobicity) for each group. The most desirable Group I results were achieved at a hydrophilicity greater than about 25 percent, while the most desirable Group II results were achieved at hydrophilicity values greater than about 55 percent. All chemical coatings in Group I (except for tannic acid 160) contain positively charged quaternary amine or imine groups. Tannic acid 160 contains polyphenol groups, which are negatively charged due to the presence of phenoxide ions. None of the chemical coatings in Group II contain quaternary amine groups; however THPS 190 contains a positively charged phosphonium ion. Group II also includes non-ionic and amphoteric surfactants. These amohoteric surfactants are different than those of Group I because they contain a tertiary amine (rather than a quaternary amine).

With further reference to FIG. 10, percentage change in boron passage is plotted as a function of change in flow, wherein flow increases by moving right along the x-axis for a selected boron rejection enhancement value. Data points 150, 155, 160, 165, 170, 175, 180, 185, 190 for the different chemical coatings generally fall into four groups based upon hydrophilicity; however the grouping of chemicals is much different than that of FIG. 9. In particular: Group I includes only data point corresponding to PHMB 175; Group II includes data points corresponding to BKC 150, lauramine oxide 155 and nonylphenol ethoxylate 185; Group III includes data points corresponding to tannic acid 160, cocamide propyl betaine 170, and octyl imino dipropionate 180; and Group IV includes EPI/DMA 165 and THPS 190. The greatest loss in flow occurred with the PHMB treatment of Group I, whereas the least loss in flow occurred with the THPS and EPI/DMA treatments of Group IV. THPS 190 was associated with excellent boron rejection, yet resulted in minimal flow loss.

With further reference to FIG. 11, change in TDS passage is plotted as a function of hydrophilicity. Unlike boron rejection enhancement, TDS rejection enhancement decreases with increases in hydrophilicity. Similar to the boron rejection enhancement values of FIG. 9, the various chemical coatings again generally segregate into groups based upon hydrophilicity, with several notable changes. Specifically, BKC 150 moved from Group I to form its own grouping, and PHMB 175 moved from Group I to Group II. More particularly, Group I includes lauramine oxide 155, tannic acid 160, EPI/DMA 165 and cocamide propyl betaine 170, whereas Group II includes PHMB 175, octyl imino dipropionate 180, nonylphenol ethoxylate 185 and THPS 190.

TDS removal is improved by many of the chemical coatings tested, including PHMB 175. However, unlike boron rejection, TDS rejection increases as hydrophilicity decreases and may be in conflict with boron rejection enhancement, depending upon the chemical coating employed. For example, while lauramine oxide 155 significantly improves TDS rejection, it has no effect on boron rejection. According to a further aspect of the present invention, different chemical coatings may be mixed to achieve a predetermined overall effect. By way of example, the predetermined effect may include boron and TDS rejection enhancement combined with biocidal properties.

Several of the treatment chemicals identified in FIG. 6 have biocidal properties. Such chemicals include PHMB 175, THPS 190, lauramine oxide 155, and cocamide propyl betaine 170. A mixture of lauramine oxide 155 and cocamide propyl betaine 170 was applied to a small pilot seawater reverse osmosis system operating on de-chlorinated city water. In 1100 hours of operation, the system treated with this mixture shows the same number of bacteria in the treated system concentrate stream as the feed stream. However, bacteria counts in the untreated control system concentrate are 60 percent higher than the feed stream, indicating significant bacterial growth. The bacteria counts were computed based on average colonies/mL of fluid, wherein the average colonies/mL was 186 for the feed stream, 189 for the treated system concentrate stream, and 297 for the control system concentrate stream.

Additional testing for biocidal properties was performed to compare the amount of colony forming units per square centimeter on a PHMB treated element versus the amount of colony forming units per square centimeter on a polypropylene cartridge filter holder located in the same reverse osmosis system, but to which PHMB does not adhere. After approximately 100 hours of operation the PHMB treated element had 522 colony forming units per square centimeter of membrane surface, whereas the polypropylene cartridge filter holder had 9936 colony forming units per square centimeter of membrane surface. The biocidal properties of the PHMB element and polypropylene cartridge filter holder were determined using a Hach heterotrophic bacteria sampler.

Treatment costs for removing boron using a single pass seawater reverse osmosis device coated with PHMB are significantly less than those using multiple-pass devices with caustic addition and ion exchange. Waters that have higher than normal boron levels may require multiple pass systems to achieve the desired boron rejection. Such multiple pass systems may include membranes coated with a PHMB treatment such that fewer passes are required to achieve the desired boron rejection levels.

In accordance with the principles of the invention, treatment of the polyamide membrane with PHMB 175 and other chemicals significantly increased the membrane's boron rejection characteristics. Advantageously, the degree of improvement in boron rejection permits the attainment of the provisional WHO standards for boron using a single-pass seawater design. Additionally, the use of a single-pass rather than multiple-pass reverse osmosis results in a dramatic cost savings. A range of chemical coatings treatments (including those set forth in FIG. 8) were evaluated to better define the properties that lead to enhanced boron rejection. In general, the chemical coatings fell into one of two groups: (I) those with a hydrophilic content below about 41 percent; and (II) those with a hydrophilic content above 41 percent.

With respect to Group I, hydrophilicity must be at least 25 percent to achieve adequate boron rejection. With respect to Group II hydrophilicity must be at least 55 percent to achieve adequate boron rejection. Group I contains two chemicals that possess the required hydrophilicity, specifically PHMB 175 and cocamide propyl betaine 170. Group II also contains two chemicals having the required hydrophilicity, specifically nonylphenol ethoxylate 185 and THPS 190.

Group I chemicals are charged either positively by quaternary amine or imine groups or negatively by phenoxide ions. Group II contains two charged species, namely THPS 190 and octyl imino dipropionate 180. While the phosphonium ion of THPS 190 is positively charged, it is significantly less electronegative than the quaternary amines and imines of Group I. Octyl imino dipropionate 180 can have two negative electrostatic charges, whereas tannic acid 160 has multiple negative charges due to the presence of many phenoxide groups. One reason that Group II members must have a greater hydrorophillicity to be effective is that the Group II chemicals have either: (1) lower electrostatic charges (or lower electronegativity in the case of the phosphonium ion); or (2) no charge.

According to another aspect of the invention, charged groups that are present in the treatment chemicals attach to carboxyl ions present on polyamide membrane surfaces, thereby enhancing boron rejection capabilities. FIG. 13 is a table illustrating charged elements (and groups of charged elements) contained in the treatment chemicals that are capable of bonding with polyamide membrane surfaces. Particularly, electrostatic bonds may be formed between target membrane group, $COO^-$, and treatment chemical groups including $NH_2^+$, $NR^1R^2R^3R^{4+}$, or $PR_4^+$. Hydrophobic bonds may be formed between aromatic target membrane groups and treatment chemical groups including —$CH_2$— and aromatic groups.

Other bonds may be formed by dipole attraction, for example: (1) between target membrane groups, COOH or $COO^-$, and treatment chemical group NH; (2) between target membrane groups, COOH or $COO^-$, and treatment chemical group COOH; (3) between target membrane groups, COOH or NH, and treatment chemical group $O^-$; and (4) between target membrane groups, COOH or NH, and treatment chemical group CHO. Additional bonds may be formed by bridging with polyvalent metal ions, such as including $Mg^{+2}$, $Ca^{+2}$, $Fe^{+2}$, $Al^{+3}$, and $Fe^{+3}$. This type of bonding may involve target membrane group, $COO^-$, and treatment chemical group $O^-$ or $COO^-$.

The chemical structure for PHMB 175 is $R_1$—NH—$R_2$. Amine groups within the PHMB 175 may be covalently bound to the carboxyl groups of the polyamide membrane to achieve a permanent amide bond, according to the following chemical reaction:

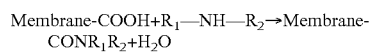

Preparation of amides from amines and carboxylic acids for reverse osmosis applications is well documented (e.g., see Keller; Membrane Technology and Industrial Separation Techniques; Noyes Data Corporation, 1976). Coupling of PHMB 175 to the free polyamidecarboxyl groups may be facilitated by the use of coupling agents. Suitable coupling agents include, but are not limited to, carbodiimide and hydroxybenzotriazole (HOBT).

In accordance with the preferred embodiment of the invention, the chemical coating is selected to contain PHMB 175 in order to achieve the desired boron rejection enhancement of 0.5 parts-per-million required by the WHO. According to further embodiments, PHMB 175 may be present in the chemical coating along with one or more of the other chemicals set forth in FIG. 8. According to additional embodiments, the chemical coating may comprise one or more of the other chemicals set forth in FIG. 8, but does not include PHMB 175.

The chemical coating preferably contains: hydrophobic groups comprising of alkane and/or aromatic groups; and/or hydrophilic groups that include one or more of the groups set forth in FIG. 10. Suitable hydrophobic alkane groups are present in all surfactants. Suitable aromatic groups include those found in all polyphenols, some surfactants, and the —$CH_2$— groups present in guanides. With respect to the hydrophilic groups set forth in FIG. 12, chemicals with nonionic or weakly ionic electrophillic groups preferably have hydrophilicity values greater than approximately 55 percent. Chemicals containing quaternary amines, imines, and multiple phenoxide groups preferably have hydrophilicity values greater than approximately 25 percent.

According to an aspect of the present invention, the chemical coatings may possess bactericidal properties. Suitable chemicals include, but are not limited to: guanides such as polyhexamethylene biguanide hydrochloride, N-alkyl betaines, N-alkyl-N,N-dimethylylamine oxides; and phosphonium compounds such as tetrakishydroxymethyl phosphonium sulfate. The above-identified compounds possessing bactericidal properties will generally contain amine, imine, or phosphonium groups.

Thus, it is seen that a method of treating reverse osmosis membranes for boron rejection enhancement has been provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A method for treating a polyamide reverse osmosis membrane for boron rejection enhancement, comprising:
   contacting the reverse osmosis membrane with a chemical coating applied by recirculating the chemical through the membrane at 50 ppm concentration and about 100 psig for about one hour to obtain a reverse osmosis membrane having a boron rejection of greater than 97.6% from seawater in a single pass,
   wherein the chemical coating comprises poly(hexmethylenebiguanide)hydrochloride.

2. The method of claim 1, wherein the reverse osmosis membrane is part of a single-pass reverse osmosis system.

3. The method of claim 2, wherein the single-pass reverse osmosis system is configured to reduce the boron concentration of normal seawater or brackish water to less than 0.5 parts-per-million.

4. The method of claim 2, wherein the single-pass reverse osmosis system is configured to reduce the boron concentration of ground water to less than 0.5 parts-per-million.

5. The method of claim 1, wherein the reverse osmosis membrane is part of a multiple-pass reverse osmosis system.

6. The method of claim 1, further comprising the step of repairing the reverse osmosis membrane by re-coating the membrane after it has degraded.

7. The method of claim 1, wherein the chemical coating comprises biocidal properties to reduce biofouling of reverse osmosis membrane surfaces.

8. The method of claim 1, wherein the chemical coating provides increased TDS rejection.

9. The method of claim 1, wherein:
   the chemical coating comprises biocidal properties; and
   the chemical coating provides increased TDS rejection.

10. The method of claim 1, wherein the reverse osmosis membrane comprises polyamide membrane surfaces; and the chemical coating comprises charged elements for bonding with the polyamide membrane surfaces.

11. The method of claim 10, wherein electrostatic bonds or hydrophobic bonds are formed between the charged elements and the polyamide membrane surfaces.

* * * * *